United States Patent [19]

Stahl et al.

[11] Patent Number: 4,947,420
[45] Date of Patent: Aug. 7, 1990

[54] COMMUNICATION SYSTEM

[75] Inventors: John I. Stahl, Coral Springs; David J. Michalak, Plantation; Klaus Knapp, Coral Springs, all of

[73] Assignee: Motorola, Inc., Schaumburg, Ill.

[21] Appl. No.: 345,056

[22] Filed: Apr. 28, 1989

[51] Int. Cl.$^5$ .................................................. H04Q 7/00
[52] U.S. Cl. ........................................ 379/57; 379/58; 340/825.44
[58] Field of Search ................... 379/56, 57, 58, 59, 379/60, 61, 62, 63; 340/825.44, 825.54

[56] References Cited

U.S. PATENT DOCUMENTS

| | | | |
|---|---|---|---|
| 3,627,955 | 12/1971 | Stone, Jr. ........................... | 179/18 |
| 4,256,928 | 3/1981 | Lesea et al. ........................ | 179/18 |
| 4,811,379 | 3/1989 | Grandfield ......................... | 379/57 |

Primary Examiner—Jin F. Ng
Assistant Examiner—Jhancy Augustus
Attorney, Agent, or Firm—Robert S. Babayi; Daniel K. Nichols

[57] ABSTRACT

A selective call communication system for use by an untrained person is provided. The communication system includes a number of telephones located in different locations, connected to a central switching unit. A number of selective call radios, each having an address, are assigned to the central switching unit. Upon the use of the telephone, the central unit identifies the telephone in use, and initiates an alerting call to the corresponding selective call radio automatically. The selective call radios may be pagers or two-way radios. Other features such as radio to radio communication, and radio to telephone network communication may be incorporated into the system.

6 Claims, 3 Drawing Sheets

COMMUNICATION SYSTEM

TECHNICAL FIELD

This invention relates generally to the field of communication systems, in particular those communication systems having selective calling capabilities.

BACKGROUND ART

In the conventional selective call or paging communication systems, a trained user is required to enter a code from a communicating means, such as a telephone in order to establish communication with a party carrying a radio responsive to the entered code. However, in applications wherein paging is required by untrained users the conventional systems may cause difficulties when utilized.

For example, a customer, in a retail store needing information on an item in a particular department, may become frustrated and leave the department store, if a speedy means for providing the information is not available. The means for providing the information may comprise a paging system for calling a department clerk who carries a radio. The paging system alerts the department clerk to provide a response to the needed information.

The response may be in the form of two-way communication, when the department clerk is carrying a two-way radio, or in the form of a phone call to the particular department, when the clerk is carrying a pager.

An untrained customer may have difficulty using a conventional paging system to call the department clerk, since he may be required to look up a department name, find a corresponding department code. Then, via a dial interconnected telephone system, enter an access code, enter the department code, and wait for the response.

SUMMARY OF THE INVENTION

Accordingly, it is an object of the present invention to provide a selective call communication system for an untrained user.

Briefly, according to the invention, a number of communicating means such as telephones are connected to a central switching unit. Upon initiation of use of any of the communicating means, central switching unit identifies the used communicating means. A number of selective call radio means having an address are addressable by the central switching unit. The central unit will automatically initiate a call to a corresponding selective call radio means upon identification of the communicating means in use.

DETAILED DESCRIPTION OF THE PREFERRED EMBODIMENT

Figure 1:
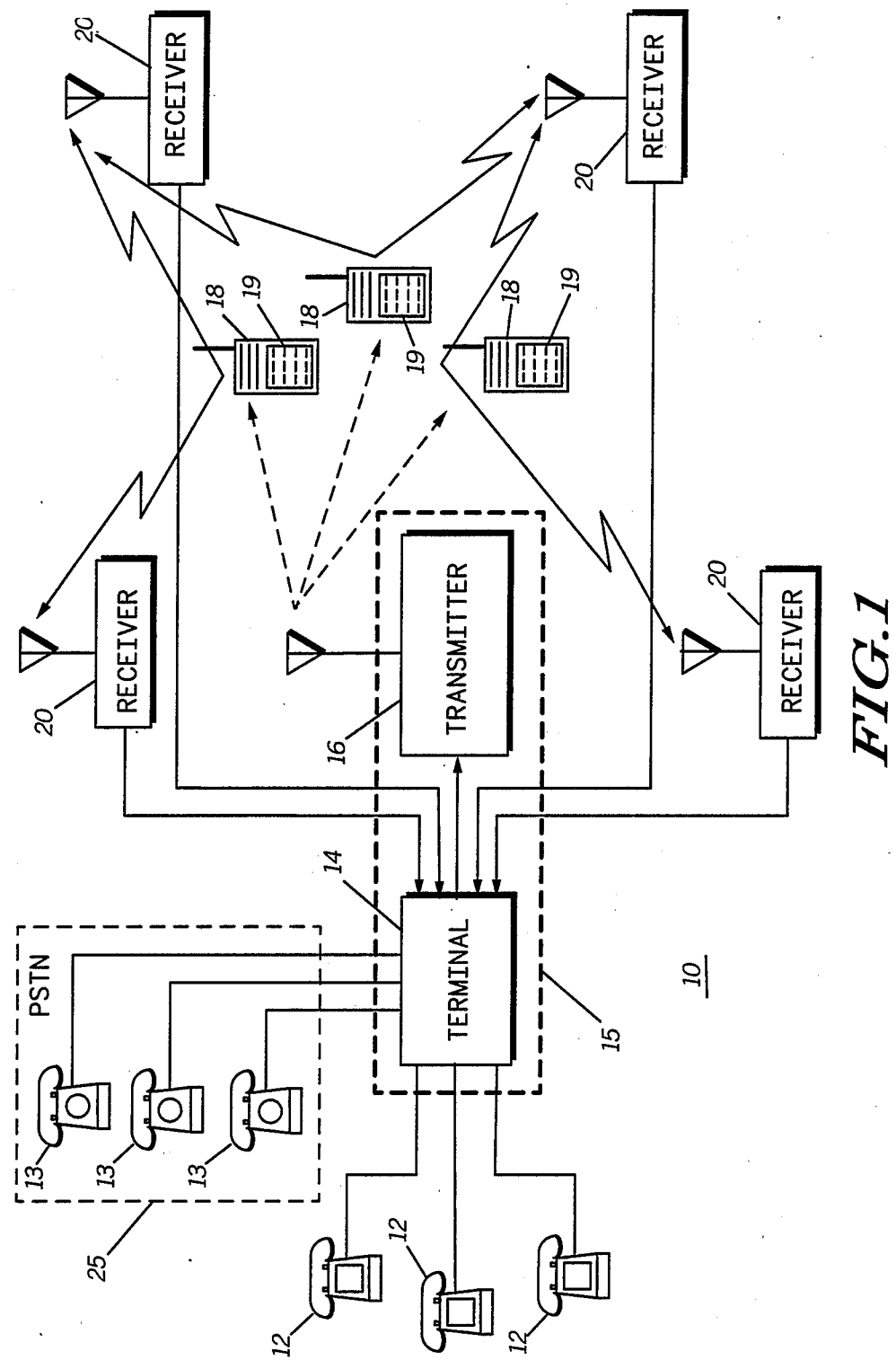
FIG. 1, is a block diagram of a communication system that may utilize the present invention.

Referring to FIG. 1, a communication system 10 in accordance with the preferred embodiment of the invention is shown. A call may be originated from one or more communicating means 12, which for untrained users can be telephones without dialing capability. A call may also be initiated from a communicating means 13 which for trained user can be phones with dialing capability. The communicating means 13 may be a part of Public Switching Telephone Network (PSTN) 25. For simplification of the discussion, hereinafter the communicating means 12 will be referred to as untrained user phones, and the communicating means 13 will be referred to as trained user phones.

Calls are inputted into system 10 for transmission to radios 18 through a central switching unit 15 comprising a paging or selective calling terminal 14 and a transmitter 16. The untrained user phones 12 may be located in different locations within a site, such as a department store. Each untrained user phone 12 is assigned to a corresponding radio 18. The radios 18 comprise selective call portable transceivers with dial interconnect capability, each having a signalling address. When an untrained user, such as a customer, initiates a call via the untrained user phone 12, the terminal 14 identifies that particular phone. After identifying the untrained user phone 12 in use, the terminal 14 formats a paging call signal with a signalling address corresponding to the corresponding radio 18. The transmitter 16 transmits the call signal on a frequency, which the corresponding radio 18 is tuned to operate. While only a single transmitter is shown in FIG. 1, it is well known in the art that communication system 10 may comprise multiple transmitters for transmitting the selective call signals and messages. Accordingly, the terminal 14 and transmitter 16 collectively constitute means for identification of a communicating means in use, and means for addressing a selective call radio.

Radio 18 upon reception of the call signal, alerts the radio 18 user, such as a department attendant. The terminal 14, after transmitting the selective call signal enables the two-way audio communication between the untrained user phone 13 and the radio 18. The radio 18 user can immediately transmit a response signal to the caller, which may comprise a voice message. Communication system 10 includes one or more system receivers 20 for receiving the response signals generated by the portable radios 18. The radio 18 transmits on the receive frequency of the receivers 20. The number of system receivers 20 utilized within the system is determined by various factors, some of which are: the transmit power of portable radios 18; the format of the response signal; and the general coverage area to be encompassed by the system. It will be appreciated by a person of ordinary skill in the art that only the response signal from the receiver providing the highest received response signal output level is selected by way of receiver voting means (not shown). One such system is disclosed in U.S. Pat. No. 4,013,962 entitled "Improved Receiver Selecting (Voting) System" to Beseke et al., assigned to assignee of the present invention, and which is incorporated herein by reference. The received response signal from selected receiver 20 will be routed through the terminal 14 for delivery to the corresponding call originating phone 12.

In the preferred embodiment of the present invention, a trained user, such as department store manager, may initiate a call via the trained user phone 13 to communicate with any radio 18 within the site. Additionally, as will be described later, a radio carrier may initiate a two-way call to another radio 18 or any telephone 13 on the PSTN 25.

It will be understood that, the coding format which is used in the preferred embodiment is not limited to any particular coding format. The Golay sequential Code (GSC) is specially suited for use in the system 10, because voice, tone only and data paging capability is supported by the coding format. Further information on the GSC code may be found in "A Guide to the Golay Sequential Code", bulletin number R8-1-67A, published by Motorola, Inc.

Figure 2:
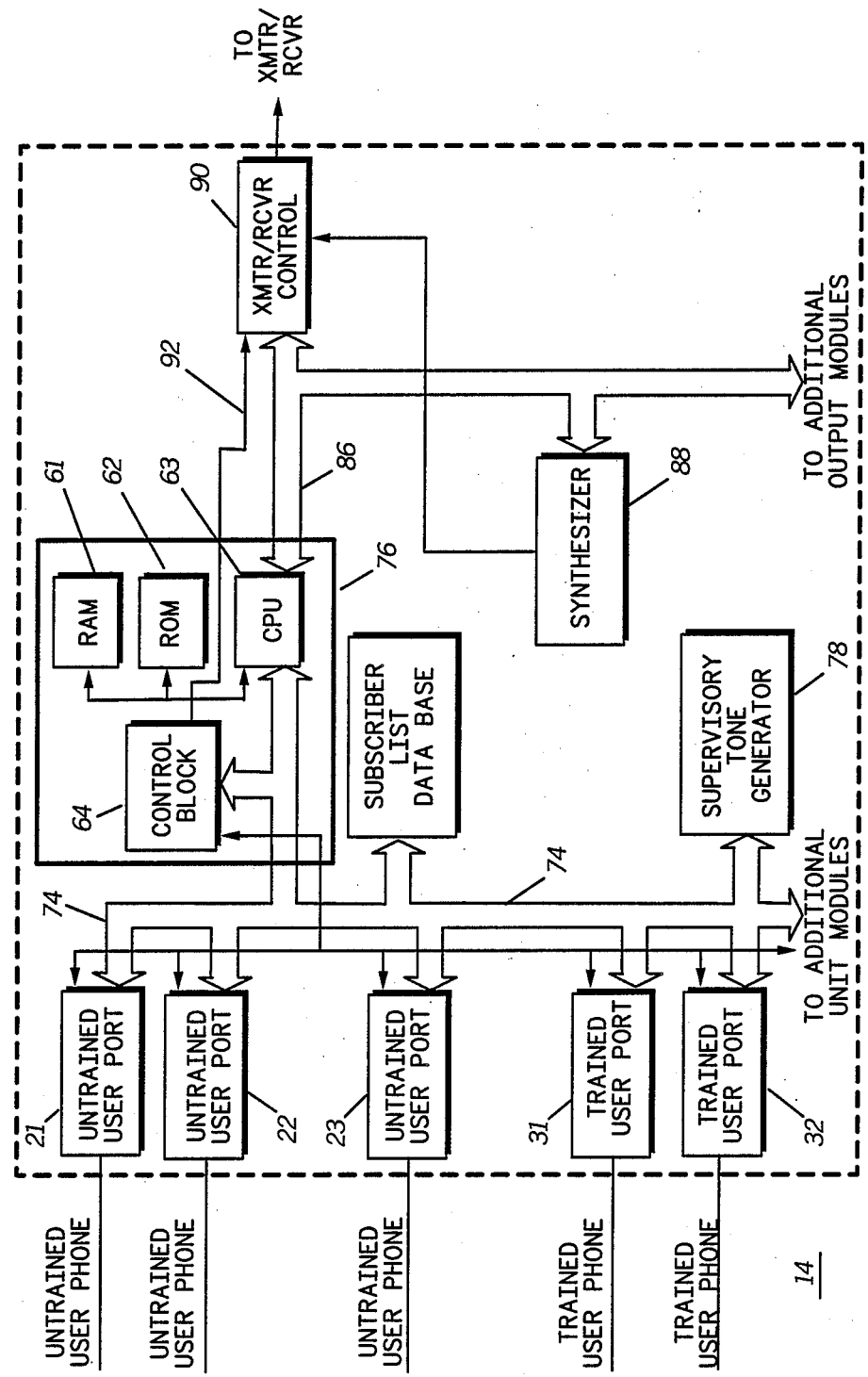
FIG. 2, is a block diagram of a selective call terminal according to the present invention.

Reference is now directed to FIG. 2, which shows a block diagram of the terminal 14 employed in the preferred embodiment of the present invention. The terminal 14 includes a controller 76, which controls the operation of the communication system 10. One or more untrained user ports 21, 22, and 23 are connected to telephones 12 of FIG. 1 designated for untrained users. Similarly one or more trained user ports 31 and 32 are connected to trained user telephones 13 of FIG. 1. When a call from one of the ports 21, 22, 23, 31 and 32 is received by the terminal 14, an output is generated on digital input bus 74 which is coupled to the controller 76. The controller 76 consists of a central processing unit (CPU) 63, such as an MC6809 manufactured by Motorola, for providing digital control through the digital input bus 74 and the digital output bus 86. Controller 76 also controls an input audio bus 84 and an output audio bus 90 through a control block 64. The control block 64 contains the hardware, such as oscillators, timers, and switch matrix for switching of voice signals, and generation of timing signals. The controller 67 also includes RAM 61 for storing temporary information, and a ROM 62 for storing the firmware for controller 76.

Assuming a call is initiated at port 21, controller 76 detects the call initiation at port 21 by detecting an off hook condition. The controller 76 locks out the remaining ports, and determines if the call is initiated by a trained or an untrained user. Controller 76, through digital input bus 74, enables supervisory tone generator 78 to generate an acknowledgment tone which is coupled to the calling input port 21. Untrained user ports 21, 22, and 23 are each assigned a pager number. The controller 76 generates a binary code, corresponding to the calling port 21 pager number, for addressing a subscriber list data base 80. The binary code is inputted to a subscriber list data base 80 to determine the selective signalling address for the corresponding radio 18. After determining the address, controller 76, through digital output bus 86, enables synthesizer 88 to generate the proper digital sequence corresponding to the address of the radio 18 being called. This digital sequence comprise the paging call signal, and is outputted to transmitter/receiver control 90 to be sent to transmitter 16 for transmission. The subscriber data base 80 generally comprise a non-volatile memory such as a hard disk or EEPROM, which may be periodically altered and updated as required for the number of subscribers on the system. For example, if a radio 18 needs to be assigned to a different untrained user phone 12, the subscriber list database 82 may be modified to reflect the change.

A response signal transmitted from the radio 18 is received by system receiver 20, and is coupled through transmitter/receiver control 90 to output audio bus 92 under control of controller 76. The response signal is next directed to input audio bus 84 for delivery to the caller through first input port 70, again under control of controller 76.

Now assuming a trained user initiates a call via a trained user phone 13, the trained user will enter a page access code, such as 7. The entered page access is processed by a DTMF to binary converter (not shown) to provide the digital data to be processed by controller 76. The controller 76 detects the call initiation at port 31, and locks out the remaining ports. The controller 76, after determining the initiation of call by a trained user, enables supervisory tone generator 78 to generate an acknowledgment tone, and indicates the terminal 14 is ready to accept the pager number of the radio 18 to be paged. The radio pager number, when received through trained user port 31, is again processed by the DTMF to binary converter to provide the digital data to be processed by controller 76. Controller 76 checks the received pager number with the subscriber list data base 80 to determine the actual pager address code to be transmitted, and transmits a pager call signal as described previously. After reception of the pager call signal by the radio 18, the radio carrier is alerted. A two-way communication between the trained user and the radio carrier may be established, after the audio path between the trained user phone 13 and radio 18 is enabled.

Conversely, a radio carrier may initiate a call to a telephone 13 on the PSTN 25 of FIG. 1. This call is initiated by transmitting a dial access code via a key pad 19 on the radio 18. The dial access code, when received through transmitter/receiver control 90, is processed by a DTMF to binary converter (not shown) to provide the digital data to be processed by controller 76. The controller 76, upon reception of the dial access code, routes the dial signal from the PSTN 25 to the transmitter 16. Once the dial signal is received by the radio 18, the radio 18 may either transmit a page access code (transmit a digit 7), or the phone number for the telephone 13 being contacted. If a page access code is entered, the controller 76 enables supervisory tone generator 78 to generate an acknowledgment tone, and indicates the paging terminal is ready to accept the pager number of another radio 18 to be paged. If no page access code is transmitted, and a telephone number is entered, the call is directed to a telephone 13 whose number is entered.

Upon termination of the call the controller 76 unlocks (enables) the locked ports, so that subsequent calls may be initiated. It is known that the throughput of communication systems 10 depends on the duration of each call. The firmware of the controller 76 may be provided with provisions to limit duration of each call.

The steps taken and the decisions made by the controller 76 are a part of the routines in the firmware of the controller, which is stored in the ROM 62. Included within ROM 62 are routines providing for input control, output control, selective call paging signal generation, and response delivery control and transceiver control. Firmware control of the paging terminal 14 is well known in the art. One such example is the Modax 1000 paging terminal manufactured by Motorola.

Figure 3:
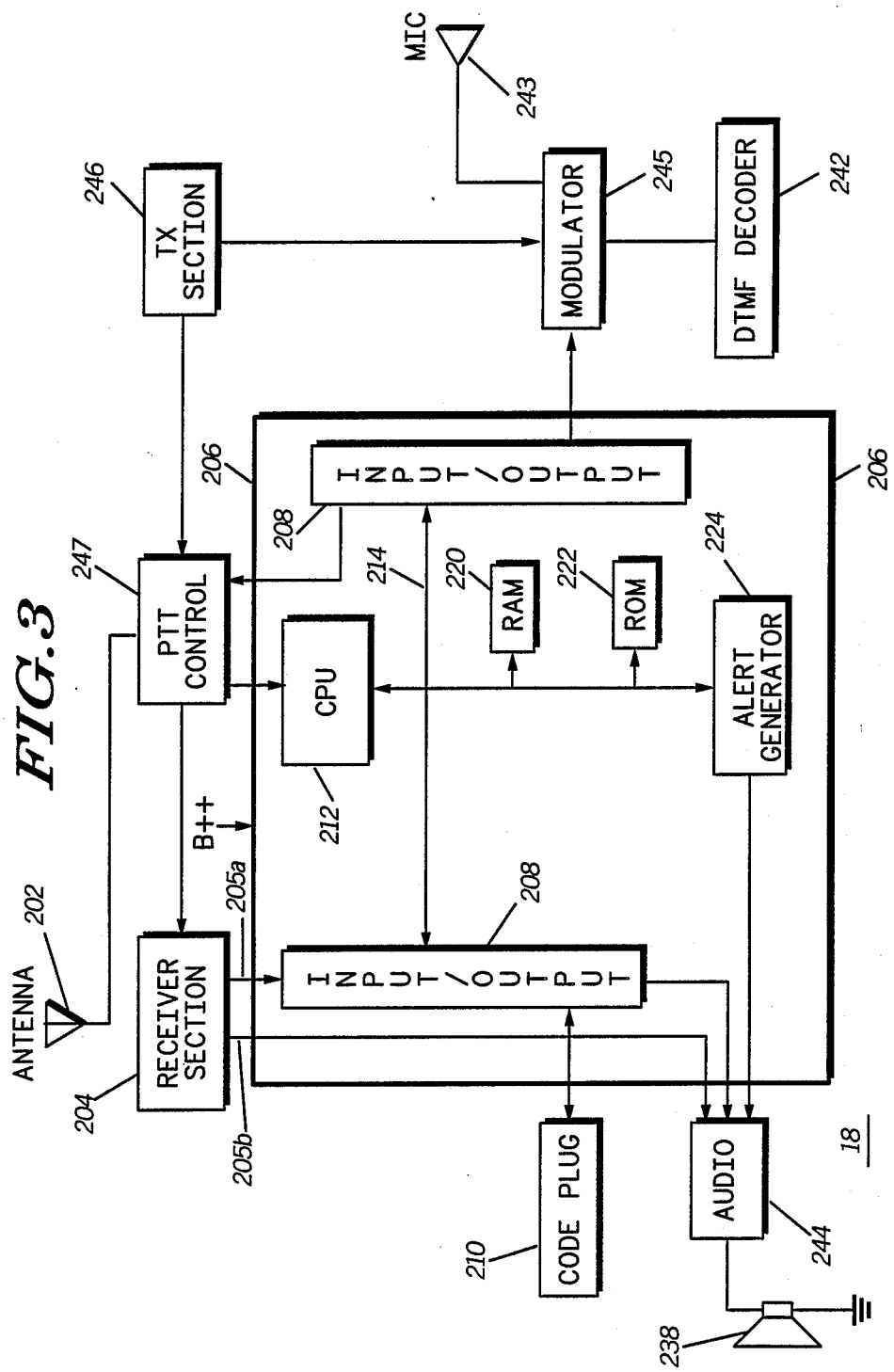
FIG. 3, is a block diagram of a two-way radio that may be utilized in the communication system of the present invention.

Reference is now directed to FIG. 3 which shows the preferred embodiment for portable radio 18 utilizing a microcomputer in its implementation. The selective call signal and message transmitted by transmitter 16 are received by antenna 202. Receiver 204 detects the selective call paging signals and messages transmitted and provides two outputs 205a and 205b. A digital output 205a providing a recovered data stream corresponding to the pager address couples to microcomputer 206 through I/O port 208. An analog output 205b corresponding to the voice message couples to audio circuit 210.

Microcomputer 206 is a single chip microcomputer, such as the MC68HC05L6 manufactured by Motorola. As shown in FIG. 3, microcomputer 206 includes a CPU 212 for operational control. An internal bus 214 connects all the elements of microcomputer 206. I/O port 208 (shown split in the figure) provides communications to the circuits external to microcomputer 206. RAM 220 is used as temporary storage of program variables. ROM 222 contains the firmware controlling microporcessor 206 operation. Programs, such as for decoding the pager address, and response signal transmission, are stored in ROM 222. An alert generator 224 provides the alerting signal in response to decoding the address information. Code plug 210 stores the predetermined address information to which the radio 18 will respond. Operation of microcomputer 206 as an address decoder is well known in the art. Once microcomputer 206 has detected one of the predetermined addresses to which it may respond, a two second alert signal is generated by alert generator 224, the output of which is coupled to audio circuit 244 for delivery by speaker 238. Microcomputer 206 generates an output at I/O port 208 which couples to audio circuit 244, enabling audio circuit 244 to deliver the voice message received from the caller. Accordingly, microcomputer 206 enables modulator 240 and push to talk (PTT) control 247 to transmit the voice signal received through microphone 243 via transmitter section 246. A DTMF decoder 242 coupled to the modulator 245 allows for transmitting access code, when a call is initiated by the radio carrier. Modulators, DTMF encoders, and transmitters suitable for transmitting the response and call signals are well known in the art.

While the basic description of the preferred embodiment of the present invention has been illustrated to a system utilizing the GSC coding format, it will be appreciated by one of ordinary skill in the art that other coding formats, such as POCSAG or two or five tone paging formats could be used equally as well. Finally, while the discussion has been limited to a system incorporating only radios for a two way communication, it will be appreciated the system described may incorporate conventional pagers without departing from the spirit or scope of the present invention. If utilized a pager can be alerted in response to a button press or an off hook condition of phones 12 or 13.

What is claimed is:

1. A communication system, comprising:
    at least one selective call radio having an address,
    at least one communicating means for use by untrained users to initiate a call, said communicating means being assigned to at least one selective call radio, wherein said assigned selective call radio may be addressed when said call is initiated,
    a central switching unit coupled to said communicating means including:
        means for identifying said communicating means when said call is initiated,
        means for addressing the assigned selective call radio upon initiation of said call,
        means for establishing communication between said communicating means and said assigned selective call radio.

2. A communication system as described in claim 1, wherein said selective call radio includes a transmitter for establishing two way communication with said communicating means.

3. A communication system as described in claim 2, wherein said central switching unit includes means for receiving information from said selective call radio.

4. A communication system as described in claim 3, wherein said central switching unit includes means responsive to said received information for addressing another selective call radio.

5. A communication system as described in claim 3, wherein said communication system further comprises a public switching telephone network coupled to said central switching unit for addressing said selective call radio via said public switching telephone network.

6. A communication system as described in claim 5, wherein said central switching unit comprises means responsive to said received information for establishing communication with said public switching telephone network.

* * * * *